(12) United States Patent
Shinohara

(10) Patent No.: US 8,902,482 B2
(45) Date of Patent: Dec. 2, 2014

(54) IMAGE FORMING APPARATUS PERFORMING OVERPRINT PROCESSING

(71) Applicant: KYOCERA Document Solutions Inc., Osaka (JP)

(72) Inventor: Yuki Shinohara, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/094,222

(22) Filed: Dec. 2, 2013

(65) Prior Publication Data

US 2014/0153053 A1 Jun. 5, 2014

(30) Foreign Application Priority Data

Dec. 5, 2012 (JP) ................. 2012-266384

(51) Int. Cl.
 *H04N 1/40* (2006.01)
 *G06K 15/02* (2006.01)
(52) U.S. Cl.
 CPC ........ *G06K 15/1878* (2013.01); *G06K 15/1889* (2013.01)
 USPC .......................................... 358/515; 358/504
(58) Field of Classification Search
 USPC ................... 358/1.9, 2.1, 500, 504, 527, 502, 358/515–523
 See application file for complete search history.

(56) References Cited

U.S. PATENT DOCUMENTS

| | | | |
|---|---|---|---|
| 6,724,500 B1 * | 4/2004 | Hains et al. | 358/1.9 |
| 7,352,488 B2 * | 4/2008 | Ben-Chorin et al. | 358/1.9 |
| 7,599,098 B2 * | 10/2009 | Cairns et al. | 358/3.21 |
| 7,925,082 B2 * | 4/2011 | Itoh | 382/162 |
| 2005/0280847 A1 | 12/2005 | Cairns et al. | |
| 2008/0186519 A1 | 8/2008 | Kodama | |
| 2009/0021754 A1 | 1/2009 | Cairns | |
| 2010/0296110 A1 | 11/2010 | Liu | |

FOREIGN PATENT DOCUMENTS

| | | |
|---|---|---|
| EP | 0924654 A2 | 6/1999 |
| EP | 2306301 A2 | 4/2011 |
| JP | 2004-255745 | 9/2004 |

OTHER PUBLICATIONS

Porter, Thomas et al., Compositing Digital Images, ACM SIGGRAPH Computer Graphics, SIGGRAPH '84 Proceedings of the 11th Annual Conference on Computer Graphics and Interactive Techniques, pp. 253-259, vol. 18, Issue 3, Jul. 1984, New York, NY.

* cited by examiner

*Primary Examiner* — Thomas D Lee
*Assistant Examiner* — Stephen M Brinich
(74) *Attorney, Agent, or Firm* — McDonnell Boehnen Hulbert & Berghoff LLP

(57) ABSTRACT

A first color conversion unit converts non-subtractive image data into subtractive image data. An overprint detection unit detects whether overprinting is specified for the subtractive image data. A drawing processing unit performs overprint processing for the subtractive image data if a color value of a foreground object, for which overprinting is specified, indicates that a region where the foreground object overlaps a background object is colored, and an underlying region of the background object behind the foreground object is colored. The color value of an overlapping region is overwritten with the color value of the foreground object. The overlapping region is not overwritten if the region where the foreground object overlaps the background object is colorless. A second color conversion unit converts image data subsequent to the overprint processing into image data having output colors in accordance with characteristics of the image forming apparatus.

20 Claims, 5 Drawing Sheets

IMAGE FORMING APPARATUS PERFORMING OVERPRINT PROCESSING

REFERENCE TO RELATED APPLICATIONS

This application is based upon and claims the benefit of priority from the corresponding Japanese Patent Application No. 2012-266384, filed in the Japan Patent Office on Dec. 5, 2012, the entire contents of which are incorporated herein by reference.

BACKGROUND

I. Technical Field

Unless otherwise indicated herein, the description in this section is not prior art to the claims in this application and is not admitted to be prior art by inclusion in this section. The present disclosure relates to image forming apparatuses performing overprint processing on a background object, where an underlying region of the background object is overlapped by a foreground object.

II. Description of the Related Art

Typical image forming apparatuses perform print-out processing through image processing on the basis of image data input though, for example, a network.

Such image forming apparatuses may perform overprint processing as part of image processing.

Overprint processing is performed by coloring an underlying region of a background object in image data overlapped by a foreground object. This coloring of the underlying region is performed with the color of the foreground object while leaving the color of the background object as is.

Specifically, image data to be processed includes combinations of the color values of a plurality of color components corresponding to a color space. In overprint processing, the color value of a region of the background object that is underlying the foreground object is overwritten. This color value is overwritten with the color value of the region of the foreground object that overlaps the background object. This color value of the foreground object indicates that the region of the foreground object is colored for each color component.

A typical image forming apparatus converts input image data into data based on CMYK (color space). CMYK is the output color space taking into consideration the output characteristics of a device. Based on CMYK, overprint processing may be performed on the basis of the image data subsequent to the color conversion.

In a typical image forming apparatus, in the case where the color space of input image data is based on CMYK, the output color values may be different from the original color values after conversion into CMYK. This is caused by image data being corrected after color conversion to prevent variations in the color of a printed-out image. Correcting image data may be based on the characteristics of devices differing based on the type of device and may change from device to device, possibly due to wear and use, or the like.

In this case, undesirable output results may be obtained since overprint processing is performed for color values that are different from the original color values.

SUMMARY

An image forming apparatus according to an embodiment of the present disclosure includes a determination unit, a first color conversion unit, an overprint detection unit, a drawing processing unit, and a second color conversion unit. The determination unit is configured to determine whether input image data has a color space based on subtractive color mixing. The first color conversion unit is configured to convert non-subtractive image data into subtractive image data, where the non-subtractive image data has a color space based on mixing other than subtractive color mixing, and wherein the subtractive image data has a color space based on subtractive color mixing. The overprint detection unit is configured to detect whether overprinting is specified for the subtractive image data. The drawing processing unit is configured to perform overprint processing for the image data if (1) a color value of a foreground object corresponding to the image data, for which it is detected that overprinting is specified, indicates that a region where the foreground object overlaps a background object is colored, and (2) an underlying region of the background object behind the foreground object is colored, wherein a color value of the overlapping region is overwritten with the color value of the foreground object, and wherein the color value of the overlapping region is not overwritten with the color value of the foreground object if the color value of the foreground object indicates that the region where the foreground object overlaps the background object is colorless. The second color conversion unit is configured to convert image data subsequent to the overprint processing performed by the image drawing processing unit into image data having output colors in accordance with characteristics of the image forming apparatus.

A non-transitory computer-readable storage medium according to an embodiment of the present disclosure stores an image forming program executable by a computer of an image forming apparatus. The image forming program includes first to fifth program codes. The first program code causes the computer to determine whether input image data has a color space based on subtractive color mixing. The second program code causes the computer to convert non-subtractive image data into subtractive image data, where the non-subtractive image data has a color space based on mixing other than subtractive color mixing, and where the subtractive image data has a color space based on subtractive color mixing. The third program code causes the computer to detect whether overprinting is specified for the subtractive image data. The fourth program code causes the computer to perform overprint processing for the subtractive image data if (1) a color value of a foreground object corresponding to the image data, for which it is detected that overprinting is specified, indicates that a region where the foreground object overlaps a background object is colored, and (2) an underlying region of the background object behind the foreground object is colored, where a color value of the overlapping region is overwritten with the color value of the foreground object, and where the color value of the overlapping region is not overwritten with the color value of the foreground object if the color value of the foreground object indicates that the region where the foreground object overlaps the background object is colorless. The fifth program code causes the computer to convert image data subsequent to the overprint processing performed through the fourth program code into image data having output colors in accordance with characteristics of the image forming apparatus.

An image forming method according an embodiment of the present disclosure includes: (i) determining, via a determination unit, whether input image data has a color space based on subtractive color mixing; (ii) converting, via a first color conversion unit, non-subtractive image data into subtractive image data, where the non-subtractive image has a color space based on mixing other than subtractive color mixing, and where the subtractive image data has a color space based on subtractive color mixing; (iii) detecting, via an overprint detection unit, whether overprinting is specified for the subtractive image data; (iv) performing, via a drawing processing unit, overprint processing for the subtractive image data if: (1) a color value of a foreground object corresponding to the image data, for which it is detected that overprinting has been specified, indicates that a region where the foreground object overlaps a background object is colored, and (2) an underlying region of the background object behind the foreground object is colored, where a color value of the overlapping region is overwritten with the color value of the foreground object, and where the color value of the overlapping region is not overwritten with the color value of the foreground object if the color value of the foreground object indicates that the region where the foreground object overlaps the background object is colorless; and (v) converting, via a second color conversion unit, image data subsequent to the overprint processing into image data having output colors in accordance with characteristics of the image forming apparatus.

Additional features and advantages are described herein, and will be apparent from the following detailed description and the figures.

DETAILED DESCRIPTION

Hereinafter, embodiments of the present disclosure will be described with reference to the drawings.

Figure 1:
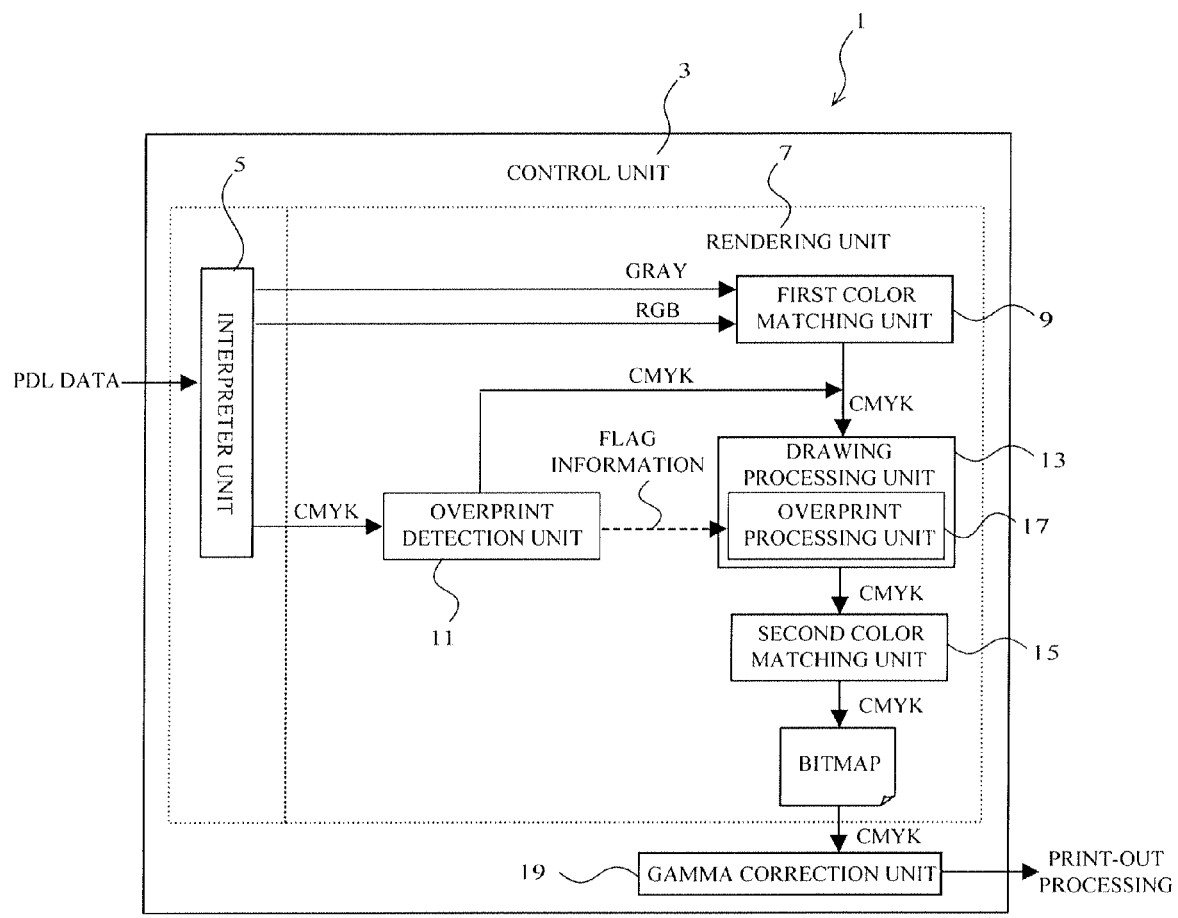
FIG. 1 illustrates a configuration of an image forming apparatus, according to an embodiment of the present disclosure.

FIG. 1 illustrates a configuration of an image forming apparatus, according to an embodiment of the present disclosure.

An image forming apparatus 1 illustrated in FIG. 1 is formed of, for example, a printer or a digital multifunction device, and has at least one printer function. As examples of the printer functions, print-out processing and image forming may be performed as part of image processing. Such printer functions may be performed based on image data that is input through a network or the like. For example, the image data may be PDL data at the time of input and may be subsequently converted into intermediate data and processed accordingly.

The image forming apparatus 1 includes a control unit 3, possibly a computer that is capable of performing image processing.

Although not illustrated in FIG. 1, the control unit 3 may include a central processing unit (CPU), a read only memory (ROM), and a random access memory (RAM).

The CPU may be a control element (arithmetic unit) that executes programs, thereby controlling the units of the image forming apparatus and performing image processing, and the like. The ROM may be a memory storing programs and the like. The RAM may be a memory which is used as a work area and the like for temporarily storing programs and various types of data during execution of the programs.

The control unit 3 may operate as an interpreter unit 5 and a rendering unit 7 by executing image forming programs stored in the ROM and the like.

The interpreter unit 5 interprets input PDL data and converts it into intermediate data. The interpreter unit 5 operates as the determination unit and allocation unit of the present disclosure.

In other words, through interpretation of PDL data, the interpreter unit 5 determines whether or not the color space of the PDL data is CMYK ("subtractive image data"), which may be a color space based on subtractive color mixing.

If the color space of the PDL data is CMYK, the interpreter unit 5 delivers the intermediate data to an overprint detection unit 11 of the rendering unit 7 described later.

On the other hand, the color space of the PDL data may include one or more of RGB data and/or gray data ("non-subtractive image data"), which may be a color space based on mixing other than the subtractive color mixing. In such instances, the interpreter unit 5 delivers the intermediate data to a first color matching unit 9 of the rendering unit 7 described later.

The rendering unit 7 performs rendering on the basis of the intermediate data delivered from the interpreter unit 5.

The rendering unit 7 includes the first color matching unit 9, the overprint detection unit 11, a drawing processing unit 13, and a second color matching unit 15 operating as the second color conversion unit of the present disclosure.

The first color matching unit 9 operates as the first color conversion unit of the present disclosure. The first color matching unit 9 converts non-subtractive image data (e.g., input RGB and/or gray data) into subtractive image data (e.g., CMYK color space data) and delivers the converted data to the drawing processing unit 13. Note that the conversion of a color space can be performed using a color look-up table.

The overprint detection unit 11 detects whether or not overprinting is specified for the intermediate data.

The overprint detection unit 11, if it is detected that overprinting is specified, delivers the flag information and intermediate data to the drawing processing unit 13, thereby instructing overprint processing. Note that if it is detected that overprinting is not specified, only the intermediate data is delivered to the drawing processing unit 13.

The drawing processing unit 13 performs drawing processing, in accordance with the received intermediate data, and generates drawing data in a bitmap format.

The drawing processing unit 13 includes an overprint processing unit 17 and performs overprint processing when overprinting has been specified in PDL data.

More specifically, the overprint processing unit 17 determines whether or not an overprint flag exists, and performs overprint processing using the intermediate data with the overprint flag as the data of a foreground object. Note that overprint processing is drawing processing utilized in the case of PostScript as a PDL or Portable Document Format (PDF).

Overprint processing in the present embodiment is performed by coloring an underlying region of a background object that is overlapped by the foreground object with the color of a foreground object, while leaving the color of the underlying region as is. Here, the foreground object corresponds to intermediate data in which the color space of PDL data is CMYK and overprinting has been specified.

Figure 2:
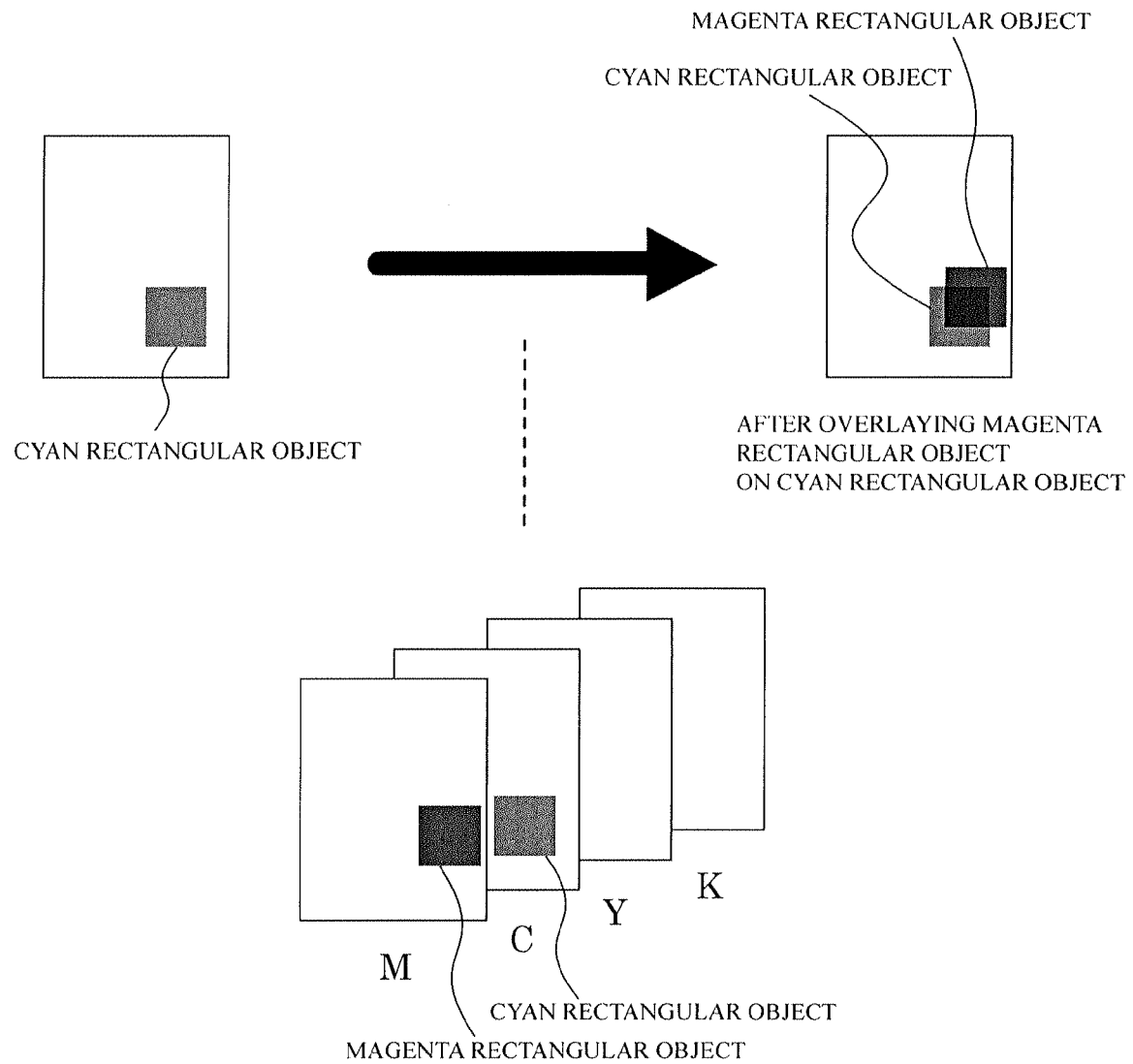
FIG. 2 illustrates an example of overprint processing, according to an embodiment of the present disclosure.

FIG. 2 illustrates an example of overprint processing, according to an embodiment of the present disclosure. Note that the example of FIG. 2 is the case in which a magenta (M) rectangular object is overlaid on a cyan (C) rectangular object.

In overprint processing, when a foreground magenta object is overlaid on a background cyan object, the colors look mixed in the overlapping area.

In overprint processing, data to be processed includes combinations of color values of color components corresponding to CMYK. The color values of an underlying region of the background object that is overlapped by the foreground object are overwritten with the color values of color components, indicating that the region of the foreground object that overlaps the background object is colored.

It should be noted that for color components indicating that the region of the foreground object overlapping the background object is colorless, overwriting with the foreground object is not performed, whereby the color values of the underlying region of the background object remain as they are.

Figure 3:
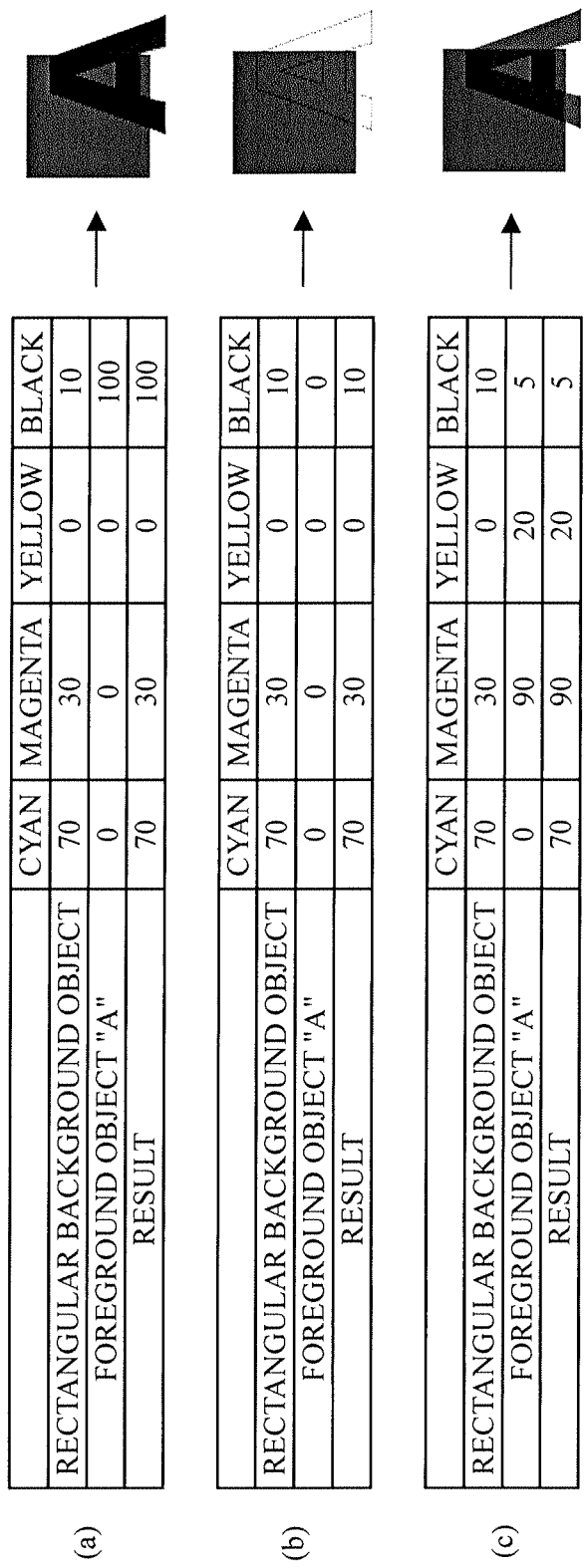
FIG. 3 illustrates another example of overprint processing, according to an embodiment of the present disclosure.

FIG. 3 illustrates another example of overprint processing, according to an embodiment of the present disclosure. In FIG. 3, the color values (cyan, magenta, yellow, and black) of a rectangular background object are (70, 30, 0, 10) and a foreground object "A" having different color values is overlaid on it.

It should be noted that in FIG. 3, the color values of the foreground object are (0, 0, 0, 100) in (a), (0, 0, 0, 0) in (b), and (0, 90, 20, 5) in (c).

In the example (a) illustrated in FIG. 3, the color values of the foreground object are "0" indicating that the region is colorless, except for black. Hence, the color value of the underlying region overlapped by the foreground object is overwritten with the color value "100" for black, indicating that the region of the foreground object is colored. On the other hand, the color values of cyan, magenta, and yellow indicate that the region of the foreground object is colorless. Thus, for cyan, magenta, and yellow, no overwriting is performed on the color values of the underlying region of the background object and they remain as they are. As a result, the color values (cyan, magenta, yellow, black) of the overlapping region become (70, 30, 0, 100).

In the example (b) illustrated in FIG. 3, since the color values of the foreground object indicate that the region is colorless for all the color components, all of the color values of the background object remain as they are. As a result, the color values (cyan, magenta, yellow, and black) become (70, 30, 0, 10). In the example (c) illustrated in FIG. 3, color values of the foreground object indicate that the region is colored magenta, yellow, and black, but not cyan. The color values indicate that the region is colorless for cyan. Hence, the color values of magenta, yellow, and black (except for cyan) are overwritten with the color values of the foreground object. Thus, the resulting color values (cyan, magenta, yellow, black) become (70, 90, 20, 5).

Other than overprint processing, drawing data in a bitmap format is generated and delivered to the second color matching unit 15 illustrated in FIG. 1, similarly to ordinary drawing processing.

The second color matching unit 15 operates as the second color conversion unit of the present disclosure. The second color matching unit 15 converts drawing data (e.g., image data) subsequent to processing (e.g., overprint processing) performed by the drawing processing unit 13 (that also includes the overprint processing unit 13), into the color values of output colors taking into consideration the output colors and/or characteristics of the device like the image forming apparatus 1. This color conversion can be performed by using a color look-up table for each color component of CMYK colors. This color conversion may be performed by multiplying the color values of the drawing data by a correction factor in accordance with the output characteristics of the device for each color component of CMYK colors.

Data subsequent to color conversion is corrected for output characteristics in a gamma correction unit 19, and then printout processing is performed as final image forming processing. Note that the operations of the gamma correction unit 19 are also realized as a result of the control unit 3 executing a program.

Figure 4:
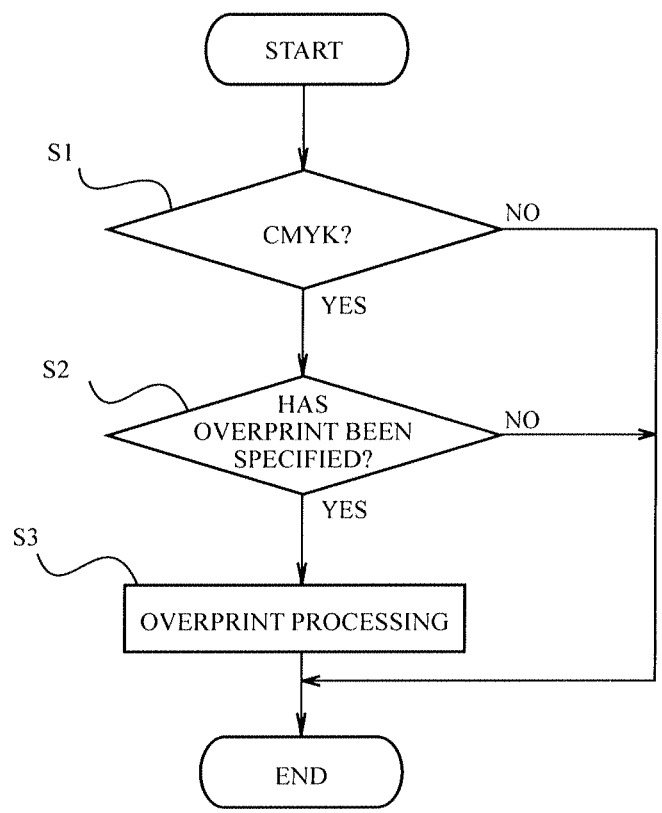
FIG. 4 illustrates a procedure of overprint processing, according to an embodiment of the present disclosure.

FIG. 4 illustrates a procedure of overprint processing, according to an embodiment of the present disclosure. This overprint processing starts as a result of PDL data being input data, possibly similar to ordinary printing.

First, in step S1, the interpreter unit 5 determines, through analysis of PDL data, whether or not the color space is CMYK.

If the color space of the PDL data is CMYK (YES), the interpreter unit 5 delivers intermediate data to the overprint detection unit 11 of the rendering unit 7 and proceeds to step S2. On the other hand, if the color space is RGB and/or gray (NO), the interpreter unit 5 delivers the intermediate data to the first color matching unit 9 of the rendering unit 7, bypassing the overprint processing S3.

Regarding RGB or gray intermediate data, after conversion of the color space into CMYK in the first color matching unit 9, the converted data is delivered to the drawing processing unit 13, where drawing processing is performed without performing overprint processing.

By converting RGB and/or gray data into CMYK data and performing drawing processing, blend processing can be reliably performed. In the blend processing, the color values of a foreground object is calculated using the color values of a background object and the color values of the foreground object. An example of such blend processing is transparency drawing processing.

In this processing, correct blend calculations may not be performed when a background object and a foreground object have different color spaces. In the present embodiment, input to the drawing processing unit 13 can be limited to CMYK data, whereby correct blend calculation is possible.

In step S2, the overprint detection unit 11 of the rendering unit 7 detects whether or not overprint has been specified for the intermediate data delivered from the interpreter unit 5.

If it is detected that overprint has been specified (YES), the overprint detection unit 11 delivers overprint flag information and the intermediate data to the drawing processing unit 13 and proceeds to step S3. On the other hand, if it is detected that overprint has not been specified (NO), the overprint detection unit 11 delivers only the intermediate data to the drawing processing unit 13 and the overprint processing ends.

Intermediate data, for which it has been detected in step S2 that overprint has not been specified, is delivered to the drawing processing unit 13, where drawing processing is performed without performing overprint processing.

In step S3, overprint processing based on the intermediate data is performed, in accordance with the overprint flag information received by the drawing processing unit 13, and the processing flow illustrated in FIG. 4 ends.

In overprint processing, as described with reference to FIG. 3, corresponding color values of the underlying region of the background object are overwritten with the color values of color components indicating that a region of a foreground object is colored, i.e., intermediate data having a flag indicating overprinting. In other instances, if the color components of the foreground object indicate that the region is colorless, the color values of the underlying region of the background object are left as they are without being overwritten.

After completion of the drawing processing, including overprint processing, drawing data generated by the drawing processing unit 13 is delivered to the second color matching unit 15, where color conversion processing is performed.

In this processing, the second color matching unit 15 converts image data subsequent to the drawing processing performed by the drawing processing unit 13 into output data of CMYK colors, in accordance with the output characteristics of the device.

The data subsequent to color conversion is printed out after the output characteristics have been compensated for in the gamma correction unit 19, as described above.

In this manner, in the present embodiment, since overprint processing is performed using the color values of CMYK colors of input PDL data, desirable overprint results may be obtained.

Figure 5:
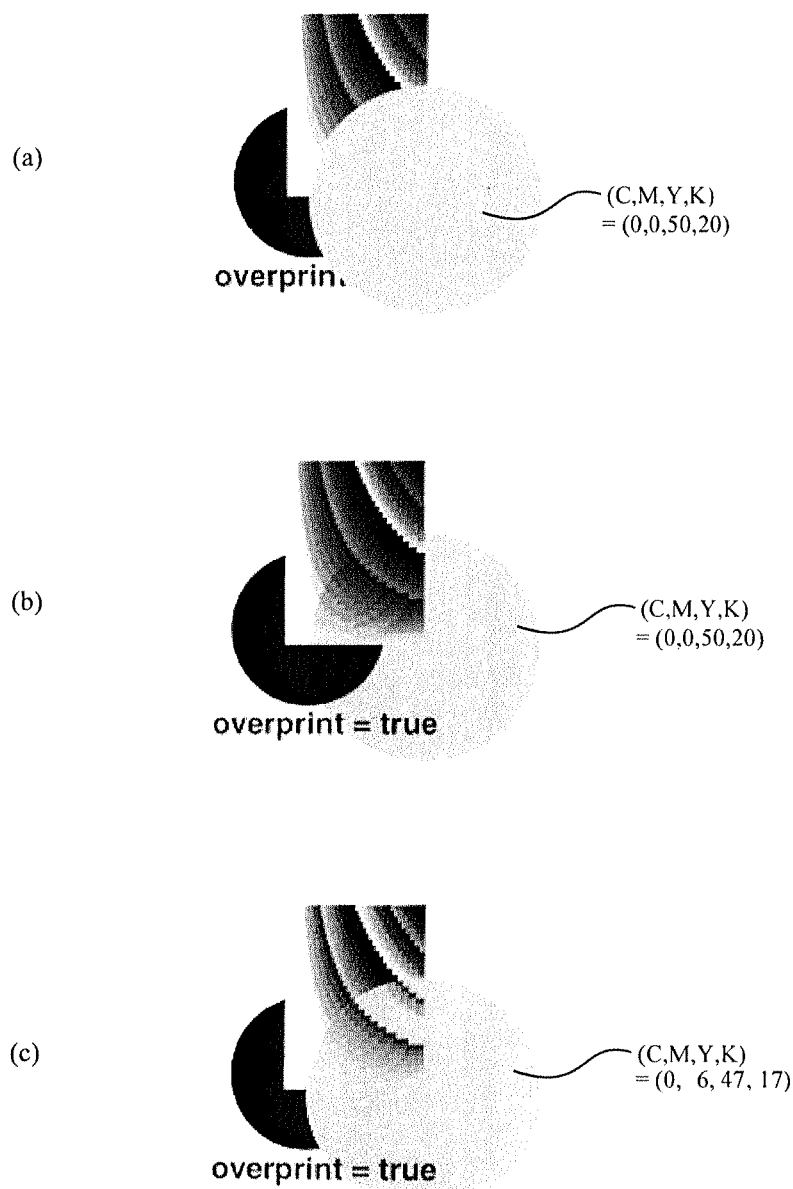
FIG. 5 illustrates overprint results of an embodiment together with overprint results, according to ordinary printing and the related art.

FIG. 5 illustrates overprint results of an embodiment together with the overprint results, according to ordinary printing and the related art. It should be noted that in FIG. 5, (a) illustrates an ordinary print result, (b) illustrates an overprint result of the present embodiment, and (c) illustrates an overprint result according to the related art. In all the examples, a circular foreground object whose color values (cyan, magenta, yellow, and black) in input PDL data are (0, 0, 50, 20) is overlaid on a background object.

In ordinary printing, only the foreground object is displayed while the background object is colored white in an overlapping region, as illustrated in (a) of FIG. 5.

On the other hand, in an embodiment with the overprinting results, the foreground object is overlaid on the background object that is left as is and the colors are mixed, as illustrated in (b) of FIG. 5.

Specifically, the foreground object does not include cyan and magenta components in the input PDL data and, hence, for the overlapping region, the cyan and magenta color values of the background object are used, and the yellow and black color values of the foreground object are used.

On the other hand, in overprinting according to possibly related art as illustrated in (c) of FIG. 5, the background object cannot be left as-is unlike the overprinting of an embodiment in the present disclosure.

In overprinting according to the possibly related art, data is converted into CMYK data in accordance with the device characteristics prior to overprint processing (drawing processing). As a result, the color values (cyan, magenta, yellow, black) of the foreground object subsequent to the color conversion become (0, 6, 47, 17) and hence, a magenta component, originally not included, is included.

Hence, in the example (c) illustrated in FIG. 5, the color values of the foreground object are used for magenta, yellow, and black, and the color value of magenta is overwritten with the color value of the foreground object. As a result, the background object is not satisfactorily left as is.

In an embodiment of the present disclosure, conversion of colors into the output colors in accordance with the characteristics of the device is performed subsequent to overprint processing, whereby the overprint processing can be performed using the color values of CMYK colors in the input PDL data, and desirable overprint results can be obtained.

Further, in the present embodiment, since conversion of colors into output colors is performed subsequent to overprint processing, the amount of toner deposited on paper can be adjusted so as not to damage the device. As a result, high-quality drawing results can be obtained in the present embodiment.

In addition, in the present embodiment, common image forming operations subsequent to the drawing processing unit 13 can be performed irrespective of different color spaces and irrespective of whether or not overprint processing is performed.

Further, in the present embodiment, since only CMYK data can be made to be input to the drawing processing unit 13, blend processing can be reliably performed and various types of image processing can be supported.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus comprising:
    a determination unit configured to determine whether input image data has a color space based on subtractive color mixing;
    a first color conversion unit configured to convert non-subtractive image data into subtractive image data, wherein the non-subtractive image data has a color space based on mixing other than subtractive color mixing, and wherein the subtractive image data has a color space based on subtractive color mixing;
    an overprint detection unit configured to detect whether overprinting is specified for the subtractive image data;
    a drawing processing unit configured to perform overprint processing for the subtractive image data if:
    (1) a color value of a foreground object corresponding to the image data, for which it is detected that overprinting is specified, indicates that a region where the foreground object overlaps a background object is colored, and
    (2) an underlying region of the background object behind the foreground object is colored, wherein a color value of an overlapping region is overwritten with the color value of the foreground object, and wherein the color value of the overlapping region is not overwritten with the color value of the foreground object if the color value of the foreground object indicates that the region where the foreground object overlaps the background object is colorless; and
    a second color conversion unit that is configured to convert image data subsequent to the overprint processing into image data having output colors in accordance with characteristics of the image forming apparatus.

2. The image forming apparatus according to claim 1, further comprising:
    an allocation unit configured to: (1) deliver the input image data to the overprint detection unit if the input image data has the color space based on subtractive color mixing and (2) deliver the input image data to the first color conversion unit if the input image data has a color space based on mixing other than subtractive color mixing.

3. The image forming apparatus according to claim 1, wherein the drawing processing unit is further configured to:
    (1) perform overprint processing to determine the color value of the foreground object in the overlapping region for each color component of the color space based on subtractive color mixing,
    (2) overwrite the color value of the overlapping region with the color value of the foreground object for a colored component, and wherein the drawing processing unit does not overwrite the overlapping region with the color value of the foreground object for a colorless component.

4. The image forming apparatus according to claim 1, wherein the color space based on subtractive color mixing is a CMYK color space.

5. The image forming apparatus according to claim 1, wherein the non-subtractive image data comprises one or more of RGB data and gray data, and wherein converting the non-subtractive image data into the subtractive image data comprises converting the one or more of RGB data and gray data into CMYK data.

6. The image forming apparatus according to claim 1, wherein converting the image data subsequent to the overprint processing into the image data having output colors in accordance with characteristics of the image forming apparatus comprises using a color look-up table for each color component of CMYK colors, and
   wherein the second color conversion unit is further configured to multiply color values of the image data subsequent to the overprint processing by a correction factor in accordance with the characteristics of the image forming apparatus.

7. The image forming apparatus according to claim 1, further comprising: a gamma correction unit configured to corrects image data subsequent to color conversion by the second color conversion unit, wherein blend processing may be performed on the corrected image data.

8. A non-transitory computer-readable storage medium storing an image forming program executable by a computer of an image forming apparatus, the image forming program comprising:
   a first program code causing the computer to determine whether input image data has a color space based on subtractive color mixing;
   a second program code causing the computer to convert non-subtractive image into subtractive image data, wherein the non-subtractive image data has a color space based on mixing other than subtractive color mixing, and wherein the subtractive image data has a color space based on subtractive color mixing;
   a third program code causing the computer to detect whether overprinting is specified for the subtractive image data;
   a fourth program code causing the computer to perform overprint processing for the subtractive image data if:
   (1) a color value of a foreground object corresponding to the image data, for which it is detected that overprinting is specified, indicates that a region where the foreground object overlaps a background object is colored, and
   (2) an underlying region of the background object behind the foreground object is colored, wherein a color value of the overlapping region is overwritten with the color value of the foreground object, and wherein the color value of the overlapping region is not overwritten with the color value of the foreground object if the color value of the foreground object indicates that the region where the foreground object overlaps the background object is colorless; and
       a fifth program code causing the computer to convert image data subsequent to the overprint processing performed through the fourth program code into image data having output colors in accordance with characteristics of the image forming apparatus.

9. The non-transitory computer-readable storage medium according to claim 8, the image forming program further comprising:
   a sixth program code causing the computer to: (1) deliver the input image data for execution of the third program code if the input image data has the color space based on subtractive color mixing and (2) deliver the input image data for execution of the second program code if the input image data has a color space based on mixing other than subtractive color mixing.

10. The non-transitory computer-readable storage medium according to claim 8, wherein the fourth program code causes the computer to:
    (1) perform overprint processing to determine the color value of the foreground object in the overlapping region for each color component of the color space based on subtractive color mixing,
    (2) overwrite the color value of the overlapping region with the color value of the foreground object for a colored component, and
    wherein the fourth program code does not cause the computer to overwrite the overlapping region with the color value of the foreground object for a colorless component.

11. The non-transitory computer-readable storage medium according to claim 8, wherein the color space based on subtractive color mixing is a CMYK color space.

12. The non-transitory computer-readable storage medium according to claim 8, wherein the non-subtractive image data comprises one or more of RGB data and gray data, and wherein the second program code causing the computer to convert the non-subtractive image data into the subtractive image data further causes the computer to convert the one or more of RGB data and gray data into CMYK data.

13. The non-transitory computer-readable storage medium according to claim 8, wherein the fifth program code causing the computer to convert the image data subsequent to the overprint processing into the image data having output colors in accordance with characteristics of the image forming apparatus further causes the computer to use a color look-up table for each color component of CMYK colors, and
    wherein the fifth program code further causes the computer to multiply color values of the image data subsequent to the overprint processing by a correction factor in accordance with the characteristics of the image forming apparatus.

14. The non-transitory computer-readable storage medium according to claim 8, further comprising:
    a seventh program code causing the computer to correct the image data subsequent to color conversion caused by the fifth program code, wherein blend processing may be performed on the corrected image data.

15. An image forming method comprising:
    determining, via a determination unit, whether input image data has a color space based on subtractive color mixing;
    converting, via a first color conversion unit, non-subtractive image data into subtractive image data, wherein the non-subtractive image data has a color space based on mixing other than subtractive color mixing, and wherein the subtractive image data has a color space based on subtractive color mixing;
    detecting, via an overprint detection unit, whether overprinting is specified for the subtractive image data;
    performing, via a drawing processing unit, overprint processing for the subtractive image data if:
    (1) a color value of a foreground object corresponding to the image data, for which it is detected that overprinting has been specified, indicates that a region where the foreground object overlaps a background object is colored, and (2) an underlying region of the background object behind the foreground object is colored, wherein a color value of the overlapping region is overwritten with the color value of the foreground object, and wherein the color value of the overlapping region is not overwritten with the color value of the foreground object if the color value of the foreground object indicates that the region where the foreground object overlaps the background object is colorless; and converting, via a second color conversion unit, image data subsequent to the overprint processing into image data having output colors in accordance with characteristics of an image forming apparatus.

16. The image forming method according to claim 15, further comprising:

delivering, via an allocation unit, the input image data to the overprint detection unit if the input image data has subtractive image data and;

delivering, via the allocation unit, the input image data to the first color conversion unit if the input image data includes non-subtractive image data.

17. The image forming method according to claim 15, wherein the image forming method further comprises:

performing, via the drawing processing unit, overprint processing to determine the color value of the foreground object in the overlapping region for each color component of the color space based on subtractive color mixing, overwriting the color value of the overlapping region with the color value of the foreground object for a colored component, and wherein not overwriting the overlapping region with the foreground object for a colorless component.

18. The image forming method according to claim 15, wherein the color space based on subtractive color mixing is a CMYK color space.

19. The image forming method according to claim 15, wherein the non-subtractive image data comprises one or more of RGB data and gray data, and wherein converting the non-subtractive image data into the subtractive image data further comprises converting the one or more of RGB data and gray data into CMYK data.

20. The image forming method according to claim 15, wherein converting the image data subsequent to the overprint processing into the image data having output colors in accordance with the characteristics of the image forming apparatus further comprises using a color look-up table for each color component of CMYK colors, and wherein the image forming method further comprises multiplying color values of the image data subsequent to the overprint processing by a correction factor in accordance with the characteristics of the image forming apparatus.

\* \* \* \* \*